United States Patent [19]

Kataigi et al.

[11] Patent Number: 5,628,864
[45] Date of Patent: May 13, 1997

[54] CUTTING UNIT IN AUTOMATIC ENCLOSING AND SEALING APPARATUS

[75] Inventors: Tsutomu Kataigi; Masayoshi Ochi, both of Tokyo, Japan

[73] Assignee: Juki Corporation, Tokyo, Japan

[21] Appl. No.: 433,376

[22] PCT Filed: Oct. 30, 1992

[86] PCT No.: PCT/JP92/01410

§ 371 Date: Apr. 28, 1995

§ 102(e) Date: Apr. 28, 1995

[87] PCT Pub. No.: WO94/09953

PCT Pub. Date: May 11, 1994

[51] Int. Cl.$^6$ ............... B26D 5/02; B26D 7/26; B43M 5/04; B65H 35/02

[52] U.S. Cl. ............... 156/441.5; 83/162; 83/408; 83/499; 156/525

[58] Field of Search ............... 83/162, 408, 425.2, 83/498, 499, 504, 508.3; 156/441.5, 525

[56] References Cited

U.S. PATENT DOCUMENTS

| | | | |
|---|---|---|---|
| 3,540,340 | 11/1970 | Koskela | 83/499 |
| 3,886,833 | 6/1975 | Gunn et al. | 83/499 |
| 4,077,291 | 3/1978 | Obenshain | 83/499 |
| 4,607,552 | 8/1986 | Siler | 83/499 |
| 4,757,732 | 7/1988 | Arima | 83/425.2 |
| 4,989,486 | 2/1991 | Miller et al. | 83/499 |
| 5,092,575 | 3/1992 | Ramsey | 271/3.1 |
| 5,099,734 | 3/1992 | Sugiyama et al. | 83/499 |
| 5,138,821 | 8/1992 | Crowley | 53/429 |

FOREIGN PATENT DOCUMENTS

| | | |
|---|---|---|
| 0298728 | 7/1988 | European Pat. Off. . |
| 58-90998 | 5/1983 | Japan . |
| 61-131899 | 6/1986 | Japan . |
| 61-229748 | 10/1986 | Japan . |
| 62-211220 | 9/1987 | Japan . |
| 2-30493 | 1/1990 | Japan . |
| WO82/03845 | 11/1982 | WIPO . |

*Primary Examiner*—Robert Davis
*Attorney, Agent, or Firm*—McCormick, Paulding & Huber

[57] ABSTRACT

A continuous sheet cutting unit constituting a part of an automatic enclosing and sealing apparatus, and making single sheet from a continuous sheet and supplying the single sheet to a subsequent unit. A setting information showing at least the width of the single sheet directly or indirectly is supplied to setting information supply means, thereby, by supplying the information of the position of slitters for cutting opposite sides of the single sheet and/or of the position of single sheet conveying guides for the subsequent unit, the information of the position of single sheet conveying guides of the subsequent unit and the setting information indicating directly or indirectly the width of the single sheet being cut to the setting information supply means, so as to locate automatically the position of slitters cutting opposite sides of the single sheet.

4 Claims, 6 Drawing Sheets

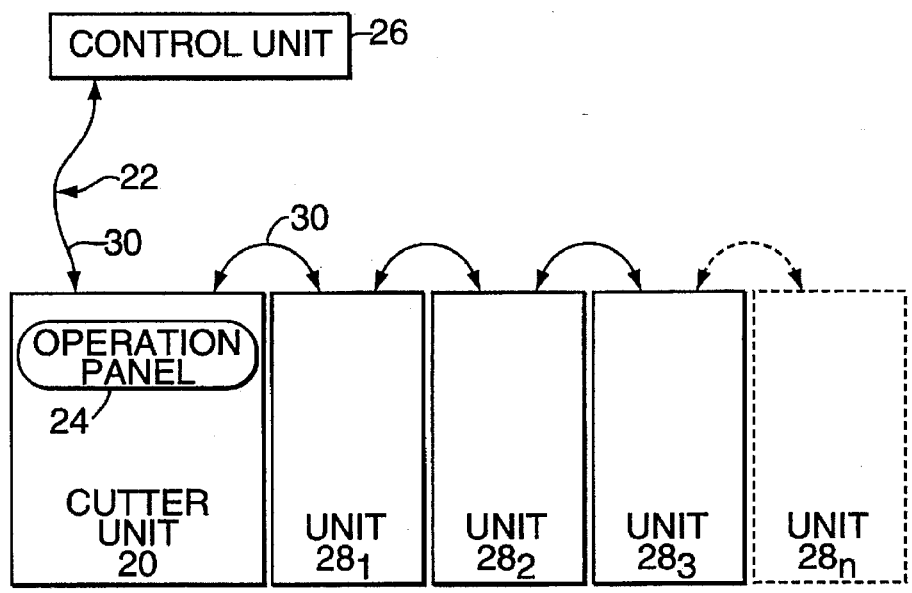
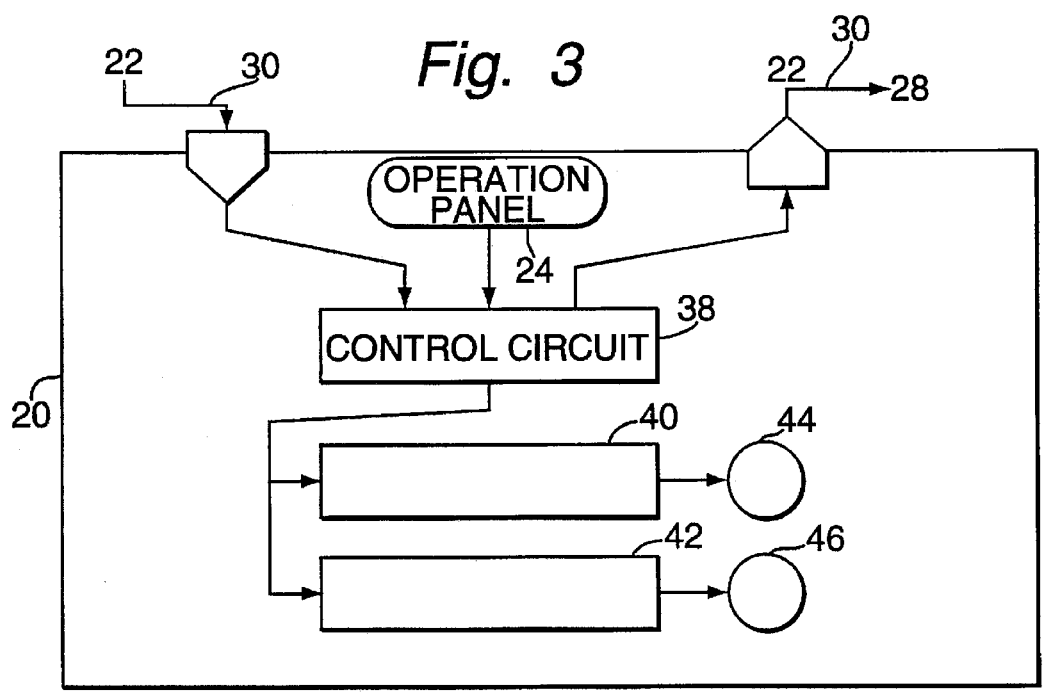

1

CUTTING UNIT IN AUTOMATIC ENCLOSING AND SEALING APPARATUS

TECHNICAL FIELD

The present invention relates to an enclosing and sealing apparatus and, particularly, to a continuous sheet cutting unit constituting a part of an automatic sheet enclosing and sealing apparatus for cutting a continuous sheet into a plurality of single sheets and supplying the single sheets to a subsequent unit.

BACKGROUND ART

Usually, in an automatic sheet enclosing and sealing apparatus, information processed by a computer is printed continuously on a continuous sheet and, thereafter, the continuous sheet is conveyed to a cutter unit and the upper and lower edge portions and the left and right edge portions of the single sheets are cut by means of longitudinal and transverse knives so as to provide a single sheet and, thereafter, the single sheet is conveyed to a subsequent unit.

A prior art cutter unit 1 will now be explained with reference to FIG. 1. The unit 1 comprises a continuous sheet conveying system 3 for conveying a continuous sheet 2 having printed thereon various information by a printer unit (not shown in the drawing) and being folded alternately along transverse perforations or being wound into a roll toward a subsequent unit, a cutting system 4 for cutting the continuous sheet 2 conveyed by the continuous sheet conveying system 3, and a single sheet conveying system 6 for conveying a single sheet 5 being cut by the cutting system 4 into the single sheet to a subsequent unit.

The continuous sheet conveying system 3 is also known as a tractor unit and acts to convey the continuous sheet 2 in the vertical directions of the sheet. The conveying system 3 conveys intermittently the continuous sheet 2 by pawls (not shown in the drawing) engaging with feeding holes 7 provided in opposite side portions of the continuous sheet 2. The location of the pawl is adjustable in a direction perpendicular to the feeding direction or the left and right direction so as to match the widthwise dimension of the continuous sheet 2. Displacement and adjustment of the pawl are usually performed manually, but in some recent and expensive apparatus, the width of the continuous sheet is detected and, the location of the pawl is adjusted automatically.

The cutting system 4 is constituted of a transverse knife and longitudinal knives for cutting the upper and lower portions and the left and right portions of the continuous sheet 2. The longitudinal knives for cutting the left and right edge portions 2a and 2b from the continuous sheet 2 so as to make a printing portion having the width W at the central printing portion of the continuous sheet is constituted of combined knives 8 consisting of respective two discs called slitters and arranged along two upper and lower shafts. The transverse knife 9 for cutting the upper and lower portions to make the single sheet having the length L is constituted of two combined blades 9a and 9b of a guillotine type.

The slitters 8 are directly driven by a motor 10 which rotates continuously and acts to cut off the left and right edge portions of the continuous sheet 2 being supplied by a tractor so as to form a predetermined width W of the single sheet. Since the predetermined width W may vary, the slitters can be adjusted manually so as to displace the location along the two upper and lower mounting shafts.

The transverse knife 9 consisting of two combined blades of the guillotine type acts to cut off the top and bottom portions of the continuous sheet 2 with the widthwise dimension being defined by the slitter 8 so as to form the single sheet 5 of a predetermined dimension. The transverse knife 9 acts to cut the continuous sheet 2 between a fixed blade 9b and a movable blade 9a being driven vertically by a cam 12 which is driven by a power source such as an electric motor 10 through an electromotive clutch 11. The cutting operation of the transverse knife 9 is performed at the stopping cycle between the conveying cycles of a tractor unit 3 which convey the continuous sheet 2 intermittently. Thus, the distance of the convey of the tractor unit is equal to the vertical distance L of the single sheet 5 being cut. The single sheet conveying system 6 consists of conveying rollers 14 which convey the single sheet 5 being cut by the cutting system 4 from the cutter unit 1 to a convey guide 13 of a subsequent unit. The single sheet 5 conveyed on the convey guide 13 of the subsequent unit has the width dimension W defined by the slitter 8, and the position of the sheet 5 is restricted by the slitter 8. Usually, in the sheet enclosing and sealing apparatus, a number of functional units are combined to perform a desired integrated function, thus, the mechanical positional relationship between subsequent units is very important in such apparatus. The conveying rollers 14 are driven by a motor rotating continuously except in an error condition, and the single sheet 5 being cut is instantly conveyed to a predetermined position of a subsequent unit. The motor for rotating the conveying roller may be the motor 10 for driving the slitters 8.

In the apparatus, the width W of the single sheet 5 being cut and the positional relationship between the single sheet 5 and the conveying guide 13 of the subsequent unit are determined simultaneously by adjusting the position of the left and right slitters 8. Namely, in adjusting the position of the left and right slitters 8, it is important to satisfy simultaneously these two requirements, or the widthwise dimension of the single sheet being cut and the positional relationship of the single sheet being conveyed. Thus, it is very difficult and time consuming to adjust the position of the slitters. Further, any automatic adjusting means utilizing such as a motor and the like have not been available and the slitters 8 are very sharp cutting edges, and the adjusting operation is very dangerous since the operator is required to perform the positional adjustment manually.

DISCLOSURE OF THE INVENTION

According to the present invention, in considering that the distance between the left and right slitters can quantitatively and unitarily be defined when the widthwise distance of the single sheet is specified, that because the position of the left and right slitters corresponds to the position of the single sheet the position of the convey guide of the subsequent unit can be automatically adjusted based on the positional information of the slitters, and that the position of the left and right slitters can be automatically adjusted based on the positional information of the convey guide of the subsequent unit; the adjustment of the dimension of the slitters, and of the position of the convey guide of the subsequent unit can be performed automatically.

Thus, the working efficiency of the cutter unit can be improved remarkably, and the need for a dangerous manual adjusting operation can be obviated.

BRIEF DESCRIPTION OF THE DRAWINGS

FIG. 2 is a flow chart showing one example of operation according to the invention;

FIG. 3 is an enlarged flow chart showing a portion of the operation of FIG. 2;

BEST MODE FOR EXECUTING THE INVENTION

Figure 1:
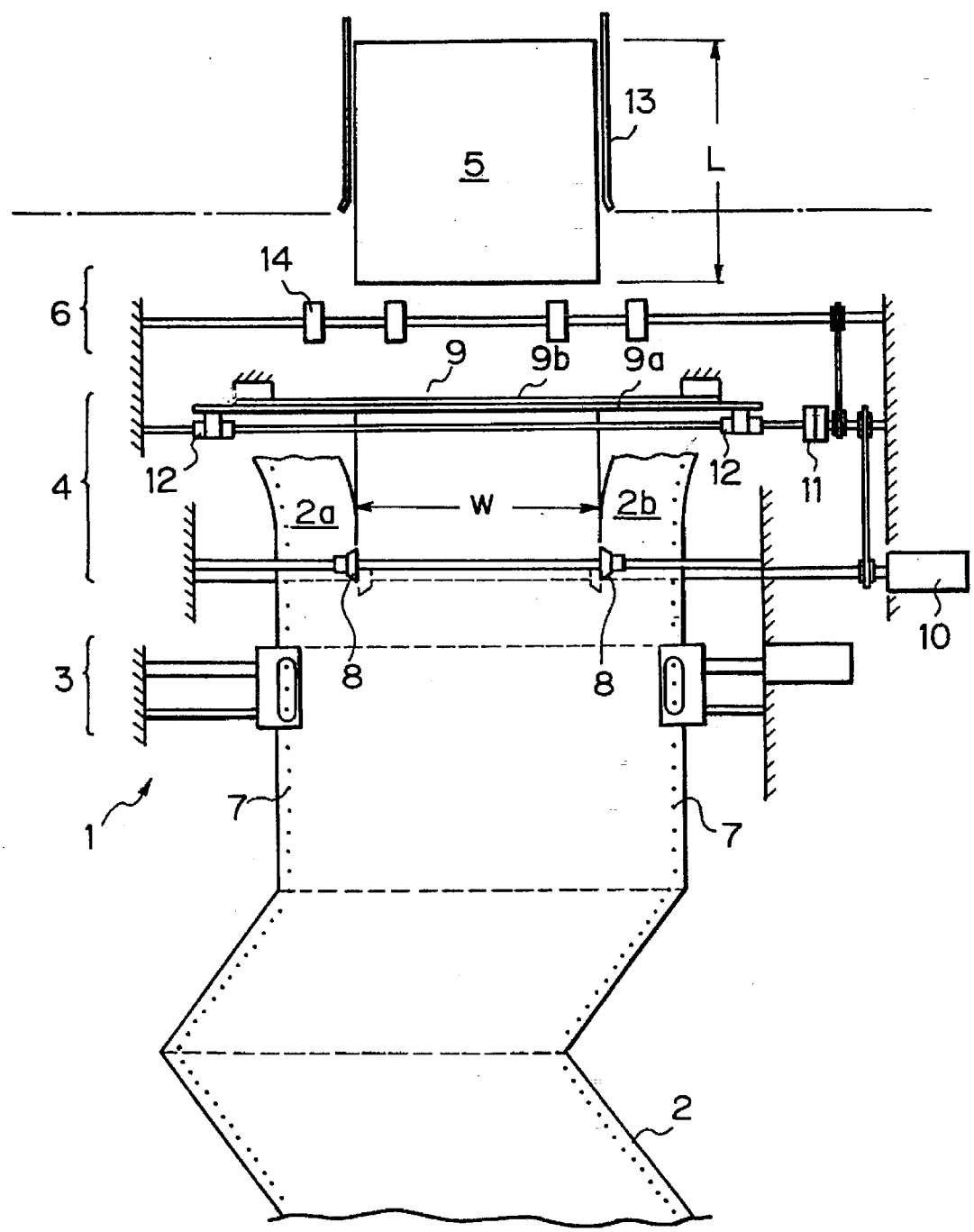
FIG. 1 is a drawing showing the general operation of a prior art cutter unit.
Figure 4:
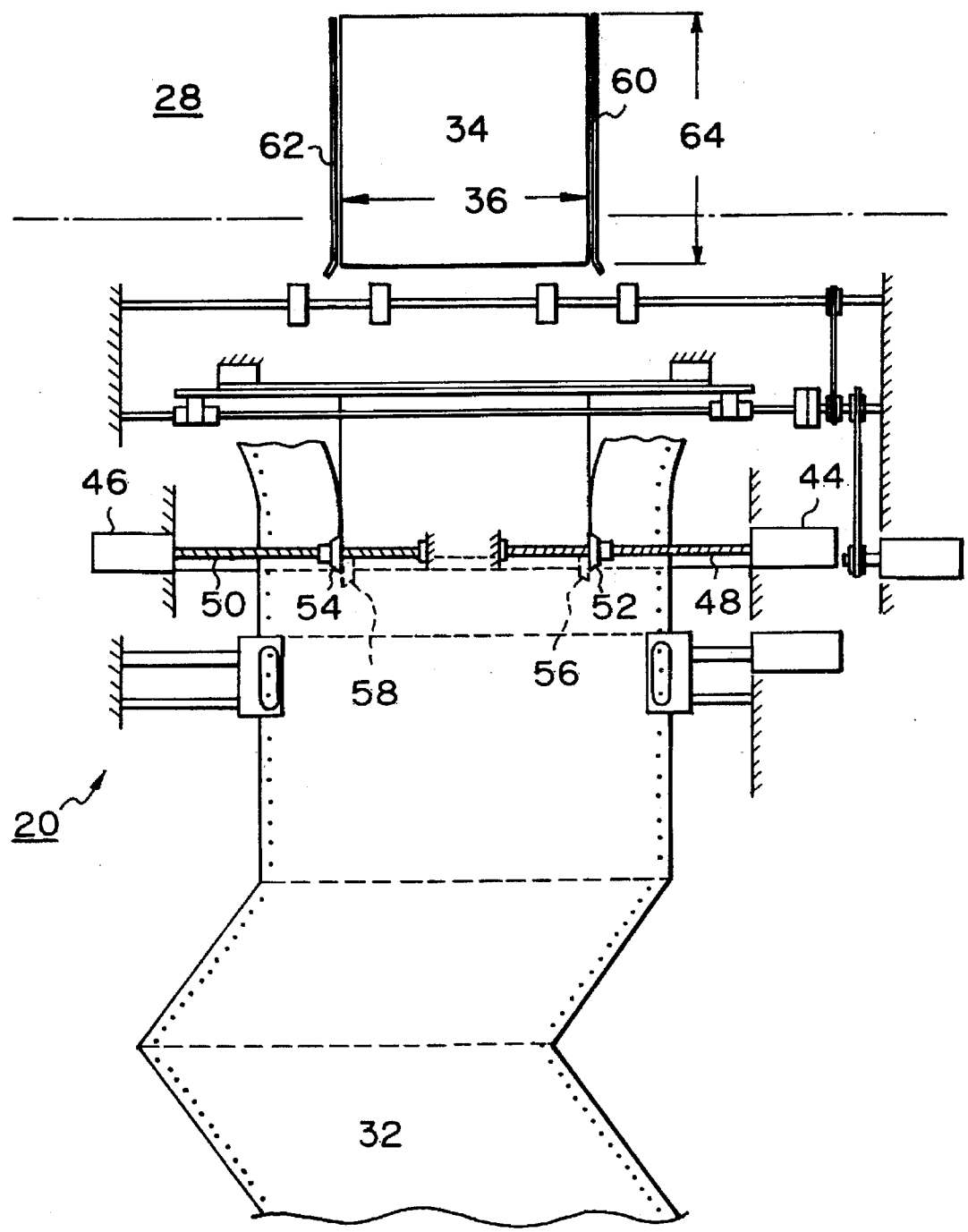
FIG. 4 is a view showing a cutter unit driven according to the flow chart shown in FIGS. 2 and 3.

FIGS. 2 and 3 are flow charts showing an example of operation system according to the invention and, particularly, a system in which the left and right slitters are driven by independent stepping motors respectively based on the width information of the single sheet, and FIG. 4 is a general view of an embodiment of a cutter unit driven by the flow chart of FIGS. 2 and 3. The apparatus shown in FIG. 4 differs from that of FIG. 1 in that the left and right slitters are independently adjustable and, for the end, the left and right slitters are independently screw-threadingly engaging with independent ball screws. The ball screws are driven by independent stepping motors.

In FIG. 2, various control information 22 to cutter unit 20 are supplied to an operation panel 24 of the cutter unit 20, or from a control unit 26 to the cutter unit 20, and to various units located fore and aft including the subsequent units $28_1$–$28_n$ including a receiving unit $28_1$ for receiving the single sheet being cut, an enclosure unit $28_2$ for overlapping the enclosure with the single sheet, an enclosing unit $28_3$ for enclosing the enclosure and the single sheet into an envelope, and other units through communicating passages 30 connecting these units with each other. The control information 22 includes (1) the information relating to the width dimension 36 of the single sheet 34 being cut from the continuous sheet 32, (2) the information relating to the length dimension 64 of the single sheet 34 being cut from the continuous sheet 32, (3) the information relating to the position of the single sheet 34 being ejected from the cutter unit (such as the center standard or the edge standard, length dimension of the continuous sheet 32, the double cut dimension between the single sheet, and the like). With respect to the single sheet position information of item (3), in the system shown in FIG. 4, in which respective units are designed having the standard at the center of the apparatus, "0" is set to show the center. However, such system are not usually designed to have the standard at the center, in such case, this information do not constitute the indispensable information. Further, the control information may include a plurality of usual information for operating automatically and as desired the cutter unit 20. The information 22 being set as above are, as shown in detail in FIG. 3, by the function of the control circuit 38 in the cutter unit 20, converted to the position information for the right side stepping motor 44 and the left side stepping motor 46, through the function of the control circuit 38 in the cutter unit 20, and in response to the position information, the right side slitter 52 and the left side slitter 54 are driven through respective ball screws 48 and 50 to predetermined position. The rotating force of these ball screws 48 and 50 is also transmitted to similar ball screws which are arranged on the lower side of the continuous sheet 32 and not shown in the drawing. Similar slitters 56 and 58 being arranged on the lower side of the continuous sheet 32 and not shown in the drawing are driven through these lower side ball screws and in the direction and the distance same to the slitters 52 and 54. The independent motor control circuits are provided on the left and right sides of the continuous sheet 32, since the center of the apparatus does not necessarily align with the center of the continuous sheet 32.

The position information is supplied, by the action of the control circuit 38, through communicating passages 30 to the control circuits of respective subsequent units $28_1$ $28_n$ as the setting information. While, in the receiving unit $28_1$ to which the setting information being supplied, the conveying guides 60 and 62 are located, based on the setting information, by a well known means not shown in the drawing. Thus, the position of the single sheet ejected from the cutter unit 20 can automatically be aligned with that of the conveying guides 60 and 62.

Figure 5:
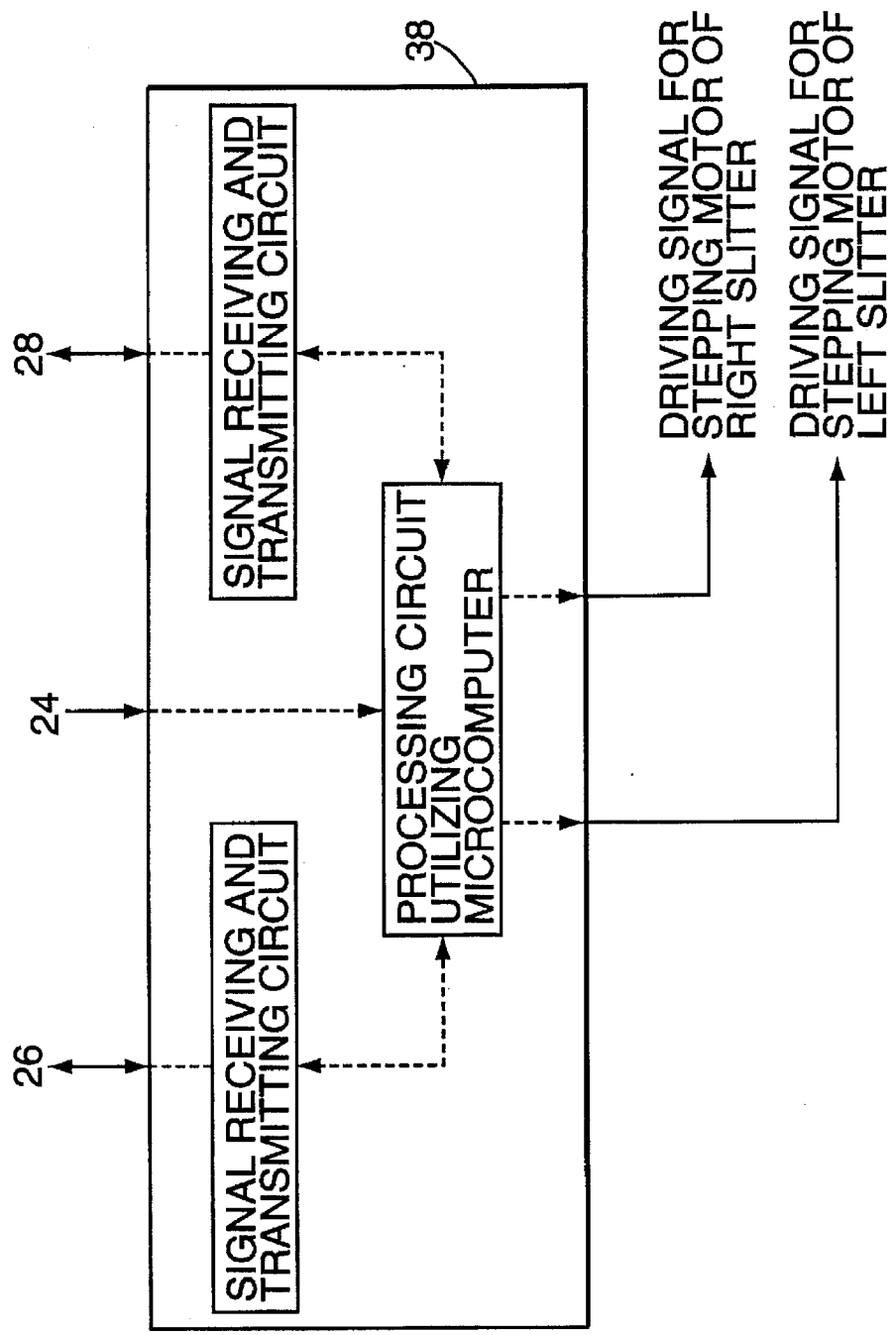
FIG. 5 is a flow chart showing the operation of the control circuit shown in FIG. 3.

Incidentally, as shown in FIG. 5, the control circuit 38 shown in FIG. 3 is usually an operational circuit utilizing a microcomputer, and in the control circuit 38 the computer processing is performed on the information supplied to the control unit 26 and the information connected to the subsequent units $28_1$–$28_n$, through signal receiving and emitting circuits respectively, and by adding integrally the information from the operation panel 24, so as to generate driving signal for the stepping motors for the left and right slitters.

Figure 6:
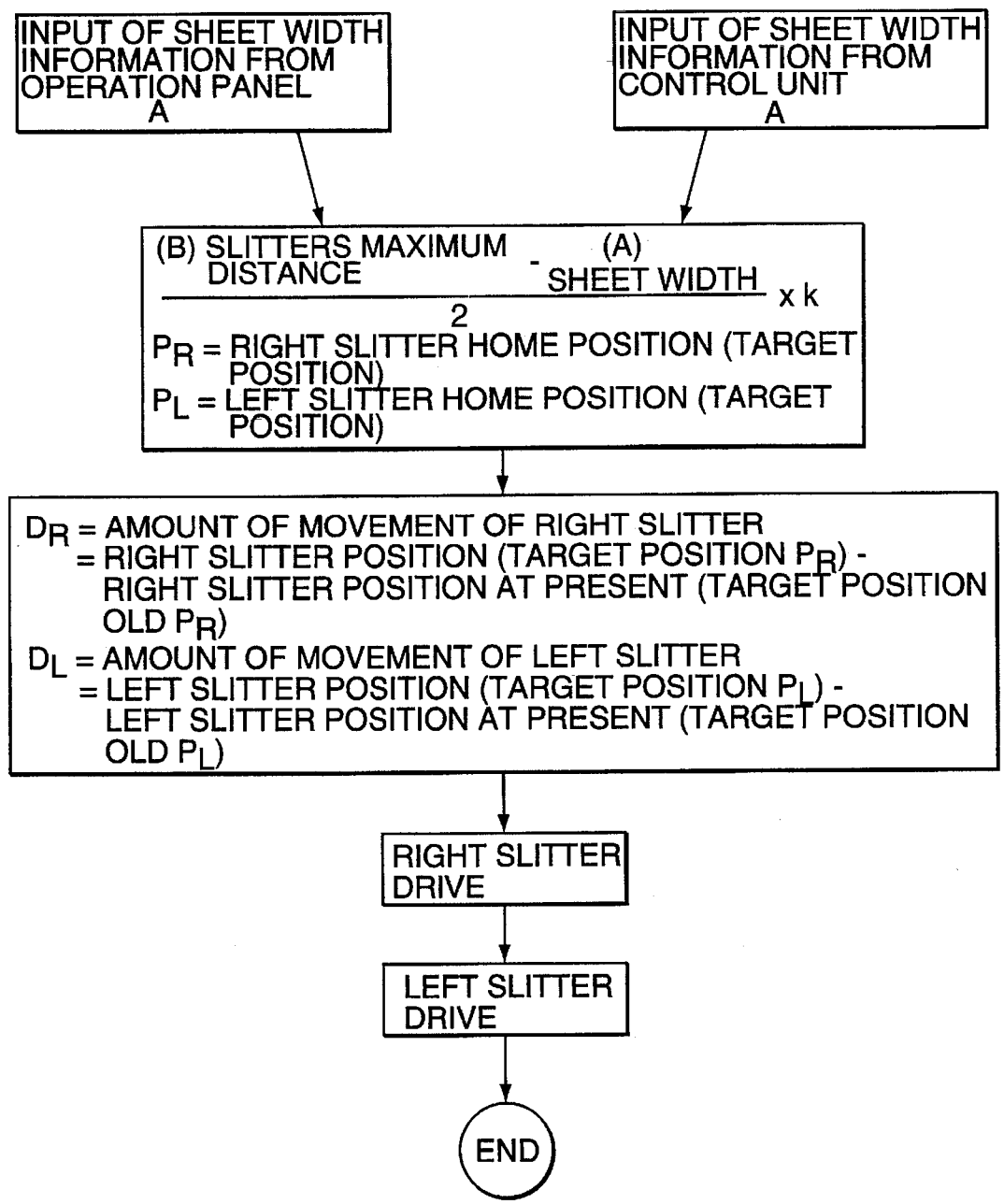
FIG. 6 is a flow chart showing the operation treatment of the microcomputer of FIG. 5.
Figure 7:
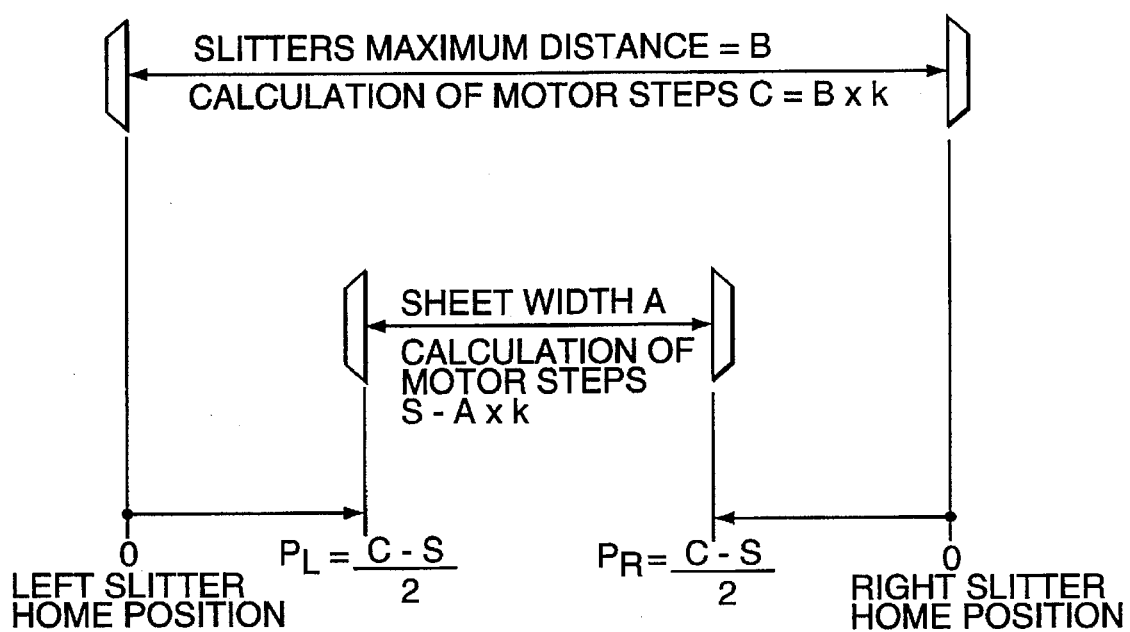
FIG. 7 is a drawing showing the method for obtaining the position of respective slitters from the flow chart of FIG. 6.

FIG. 6 is a flow chart of the processing in the microcomputer and the driving of the stepping motors for the left and right slitters shown in FIG. 5. In FIG. 6, the positioning of the left and right slitters is started by the input A of the sheet width information from the micro-computer or from the operation panel. The position to which the left and right slitters are moved is calculated from the information A being inputted. The calculating process will now be explained referring FIG. 7. As shown in FIG. 7, the maximum distance B between the left and right slitters is the slitter distance (mm) when the slitters are located at home positions. The number of the steps of the motor of the distance B is calculated by multiplying the distance B with a coefficient k which is determined from the mechanism. The calculation process is performed based on the conversion value. For example, when one step of the motor corresponds to the distance 0.05 mm, k=0.05 step/mm. Thus, in conversing the maximum distance B between the left and right slitters into the number of steps, (B×k) steps are obtained, which is put as C. Next, the target position to which the slitters are displaced is calculated from the width A of the sheet. By setting the value S as the converted number of the width A of the sheet, (S=A×k) is obtained. The subsequent description will be made based on the converted number of the steps of the motor. As shown in FIG. 7, the number of steps $P_R$ and $P_L$ of the right and left slitter positions can be obtained by the subsequent equation.

$$P_R = P_L [(\text{maximum distance } C \text{ of slitters}) - (\text{width } S \text{ of sheet})]/2$$

Next, the amount of displacement of the slitters is calculated. The position of the right and left slitters at present are respectively set as (OLD $P_R$) and (OLD $P_L$). Thus, when the present position of the slitters are the home position, the (OLD $P_R$) and (OLD $P_L$) are zero respectively.

$$\text{Amount of movement of right slitter } D_R = P_R - (\text{OLD } P_R)$$

$$\text{Amount of movement of left slitter } D_L = P_L - (\text{OLD } P_L)$$

It will be noted that the value $D_R$ and $D_L$ are values having signs (+) or (−) which shows the direction of the displacement.

Then, the slitters are displaced by driving the stepping motors. The left and right motors may be rotated simultaneously.

The information passing through the communication passage 30 of FIG. 3 includes the subsequent (not exclusively):

(1) Control information such as the following:
   a. START (action starting command for the system)
   b. STOP (stopping command for the system)
   c. ERROR (notifying an error condition in either one unit in the system)

(2) Setting information
   a. Cutter unit
      WIDTH (the width of cut sheet)
      LENGTH (longitudinal length of continuous sheet)
      CUT FORM (double cut or single cut)
   b. Relating to the subsequent unit
      i) from the cutter unit to the subsequent unit
         POSITION of LEFT SLITTER
         POSITION of RIGHT SLITTER
         LENGTH of SINGLE SHEET
         (the single sheet supplied from the cutter unit)
      ii) from the control unit and through the cutter unit
         (when the information is collected to the control unit through transmitting circuit and, is transmitted to respective units)
         POSITION of LEFT SLITTER
         POSITION of RIGHT SLITTER
         LENGTH of SINGLE SHEET
         (the single sheet supplied from the cutter unit)
         OTHER INFORMATION (when the subsequent units include a unit for folding the single sheet, the folding form and the like)

In above described embodiments of the present invention, the description is made that the information transmitted from the cutter unit 20 to the subsequent units $28_1$–$28_n$ is utilized as the position information of the left and right slitters, however, according to the present invention, it is possible to effectively utilize other information. For example, (1) The width information of the single sheet may be supplied to the subsequent unit. In this case, the "single sheet width" information supplied from the control unit may directly be transmitted. (2) The single sheet width information and the single sheet position information are transmitted to the subsequent unit. This case is similar to the (1) case, but, is effective when the conveying mechanism is designed to have the standard not located at the center. (3) The information of the conveying standard of the subsequent unit is transmitted to the cutter unit, and the information of the width of the single sheet is supplied from either of the control unit and the operation panel. Accordingly, the present invention is not limited to that the necessary information are supplied from either of the control unit and the operation panel. The necessary information may be collected to the control unit through transmitting passages and may be supplied to respective units. For example, the information of conveying standard to the subsequent units may be transmitted to the cutter unit. Further, when the constitution of the system is clearly given, the information may be transmitted directly between respective units.

As described above, according to the present invention, by enabling the automatic adjustment of the positioning of the slitters, it is possible to automatically align the single sheet conveying position and the width of the single sheet, which improves substantially the operability of the system. Further, the accuracy of the width of the single sheet is comparable to the accuracy of the device for positioning the slitters, which omits the necessity for measuring the width of the single sheet. Further, since the position of the slitters can be adjusted automatically the adjusting operation performed at dangerous location can be omitted and the safety of the operators can be improved remarkably.

We claim:

1. An automatic enclosing and sealing apparatus including:

a control unit for inputting control information including width information relating to the width of a single sheet being cut from a continuous sheet;

a cutter unit for displacing and adjusting slitters in a widthwise direction for cutting the width of the single sheet so as to have a widthwise dimension, and a plurality of subsequent units including at least a supply unit for supplying the single sheet and an enclosure overlapping the single sheet, and a unit for enclosing the single sheet and the enclosure into an envelope, said control unit, said cutter unit and said subsequent units are arranged serially, wherein the cutter unit comprises:

a control circuit for calculating and setting the position information for setting the position of the slitter in response to the width information, drive means for driving the slitters, in response to the width information, to the response position, and said control circuit for supplying the position information to said subsequent units.

2. An automatic enclosing and sealing apparatus including:

a control unit inputting control information including width information relating to the width of a single sheet being cut from a continuous sheet;

a cutter unit for displacing and adjusting slitters in a widthwise direction for cutting the width of the single sheet so as to have a widthwise dimension, a plurality of subsequent units including at least a supply unit for supplying the single sheet and an enclosure overlapping the single sheet, and a unit for enclosing the single sheet and the enclosure into an envelope, and said control unit, said cutter unit and said subsequent units are arranged serially, wherein the cutter unit comprises:

a control circuit for calculating and setting the position signal for setting the position of the slitters in response to the width information, drive means for driving the slitters, in response to the width information, to the calculated position, and said control circuit for supplying the width information to said respective subsequent units.

3. An automatic enclosing and sealing apparatus according to claim 1, wherein the apparatus comprises an operation panel for inputting said width information independently.

4. An automatic enclosing and sealing apparatus according to claim 2, wherein the apparatus comprises an operation panel for inputting said width information independently.

* * * * *